United States Patent
Zrnic et al.

(10) Patent No.: US 6,448,923 B1
(45) Date of Patent: Sep. 10, 2002

(54) EFFICIENT ESTIMATION OF SPECTRAL MOMENTS AND THE POLARIMETRIC VARIABLES ON WEATHER RADARS, SONARS, SODARS, ACOUSTIC FLOW METERS, LIDARS, AND SIMILAR ACTIVE REMOTE SENSING INSTRUMENTS

(76) Inventors: Dusan S. Zrnic, 1313 Halley Ct., Norman, OK (US) 73069; Sebastian Torres, 514 Sooner Dr., Apt. A, Norman, OK (US) 73069

(*) Notice: Subject to any disclaimer, the term of this patent is extended or adjusted under 35 U.S.C. 154(b) by 0 days.

(21) Appl. No.: 09/819,682

(22) Filed: Mar. 29, 2001

(51) Int. Cl.$^7$ ............ G01S 13/00; G01S 15/00
(52) U.S. Cl. ............ 342/26; 342/189; 342/195; 367/100
(58) Field of Search ............ 342/26, 189, 195; 356/3.01–5.15; 367/100

(56) References Cited

U.S. PATENT DOCUMENTS

| | | | |
|---|---|---|---|
| 3,940,767 A | 2/1976 | DeLano et al. ............ 343/16 R |
| 5,394,155 A | * 2/1995 | Rubin et al. ............ 342/192 |
| 5,442,359 A | * 8/1995 | Rubin ............ 342/109 |
| 5,744,710 A | * 4/1998 | Abatzoglou et al. ............ 73/170.11 |
| 6,081,221 A | 6/2000 | Zrnic et al. ............ 342/26 |
| 6,087,973 A | 7/2000 | Rowe et al. ............ 342/50 |
| 6,097,669 A | 8/2000 | Jordan et al. ............ 367/99 |
| 6,111,537 A | 8/2000 | Andersson ............ 342/137 |
| 6,307,500 B1 | * 10/2001 | Cornman et al. ............ 342/26 |

OTHER PUBLICATIONS

"The Relation Between Range Sampling Rate, System Bandwidth, and Variance Reduction in Spectral Averaging for Meteorological Radar," Urkowitz, H.; Katz, S.L. Geoscience and Remote Sensing, IEEE Transactions on, vol.: 34 Issue: 3, May 1996. pp.:612.*

* cited by examiner

Primary Examiner—Thomas H. Tarcza
Assistant Examiner—Brian Andrea
(74) Attorney, Agent, or Firm—Thomas Zack (57) ABSTRACT

A method for estimation of Doppler spectrum, its moments, and polarimetric variables on pulsed weather radars which uses over sampled echo components at a rate several times larger than the reciprocal of transmitted pulse length. The variables are estimated by suitably combining weighted averages of the over sampled signals in range with usual processing of samples at a fixed range location. The invention may be Used on pulsed weather radar, lidars, sonars and accoustic flow meters.

4 Claims, 7 Drawing Sheets

PROCESSING TO OBTAIN DOPPLER SPECTRUM AND ITS MOMENTS

STANDARD DEVIATION OF SPECTRAL MOMENT ESTIMATES
COMPARISON OF TRADITIONAL AND PROPOSED PROCESSING SCHEMES

EFFICIENT ESTIMATION OF SPECTRAL MOMENTS AND THE POLARIMETRIC VARIABLES ON WEATHER RADARS, SONARS, SODARS, ACOUSTIC FLOW METERS, LIDARS, AND SIMILAR ACTIVE REMOTE SENSING INSTRUMENTS

BACKGROUND OF THE INVENTION

This invention relates to a method for estimation of Doppler spectrum, its moments, and polarimetric variables on pulsed weather radars which uses over sampled echo components taken at a rate several times larger than the reciprocal of transmitted pulse length.

Methods that are used to estimate values derived from using remote sensing systems are known. For example, in one such earlier system a radar uses an electronic receiver to receive and convert direction signals derived from an antenna to develop output signals in a predetermined manner. In another earlier invention, a method of resolving range ambiguities and separating overlaid signals in a Doppler radar system is disclosed.

Another prior art method is used to increase the accuracy of ranging measurements between data link systems.

A method for determining Doppler shifts and reflectivity data in sodars uses a high powered sodar pulse consisting of a string of concatenated wavelets, is disclosed in another invention. The reflected portion of the transmission is amplified and digitized as a string of samples of time which correspond to the range from the transmitter.

Still another invention discloses a method for reducing false target echo indications in a pulse Doppler radar having at least two different pulse repetition frequencies during the period in which the main beam of the radar illuminates a target.

DESCRIPTION OF THE PRIOR ART

Methods used to estimate values derived by remote sensing systems are known and disclosed in the prior art. For example, U.S. Pat. No. 3,940,767 to DeLano et al. discloses a radar system that uses an electronic receiver to receive and convert direction signals derived from an antenna to develop output signals in a predetermined manner.

U.S. Pat. No. 6,081,221 to Zrnic et al. discloses a method of resolving range ambiguities and separating overlaid signals in a Doppler radar system.

U.S. Pat. No. 6,087,973 to Rowe et al. discloses a method used to increase the accuracy of ranging measurements between data link systems.

U.S. Pat. No. 6,097,669 to Jordan et al. discloses a method to determine Doppler shifts and reflectivity data from sodars. It uses a high powered sodar pulse consisting of a string of concatenated wavelets. The reflected portion of the transmission is amplified and digitized as a string of samples of time which correspond to the range from the transmitter.

U.S. Pat. No. 6,111,537 to Andersson discloses a method for reducing false target echo indications in a pulse Doppler radar having at least two different pulse repetition frequencies during the period in which the main beam of the radar illuminates a target.

In the present invention a method for estimation of Doppler spectrum, its moments, and polarimetric variables on pulsed weather radars which uses over sampled echo components taken at a rate several times larger than the reciprocal of transmitted pulsed length is disclosed, all as will be detailed in the specification that follows hereafter.

SUMMARY OF THE INVENTION

This invention relates to a method for estimation of Doppler spectrum, its moments, and polarimetric variables on pulsed weather radars which uses over sampled echo components taken at a rate several times larger than the reciprocal of transmitted pulse length.

It is the primary object of the present invention to provide for an improved method for estimating Doppler spectrum, its moments, and polarimetric variables.

Another object is to provide for such a method which operates on over sampled echo components taken at a rate several times larger than the reciprocal of the transmitted pulse length.

These and other objects and advantages of the present invention will become apparent to readers from a consideration of the ensuing description and the accompanying drawings.

DESCRIPTION OF THE PREFERRED EMBODIMENT

The present invention relates to a method for estimating Doppler spectrum, its moments, and polarimetric variables from pulsed radar signals. The following steps are utilized in this method: a) over sampling pulsed polarimetric weather radar signals whose Doppler spectrum, its moments, and polarimetric variables are to be estimated; b) decorrelating with the over sampled signals in range, c) determining the autocorrelation and cross correlation of these signals in sample time; d) determining the Doppler spectra of these signals; and based upon the determinations of steps (a) to (d), average the estimates of auto, cross correlations, Doppler spectra from consecutive range locations to vastly improve the estimates of spectral moments and and polarimetric variables.

Figure 2A:
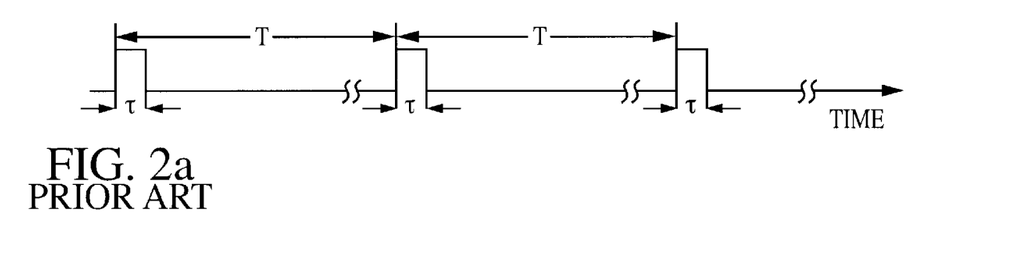
FIGS. 2(a)–2(c) depict a sampling in range and the processing of signals according to the prior art, and FIGS. 2(d)–2(f) as in the present invention.
Figure 2B:
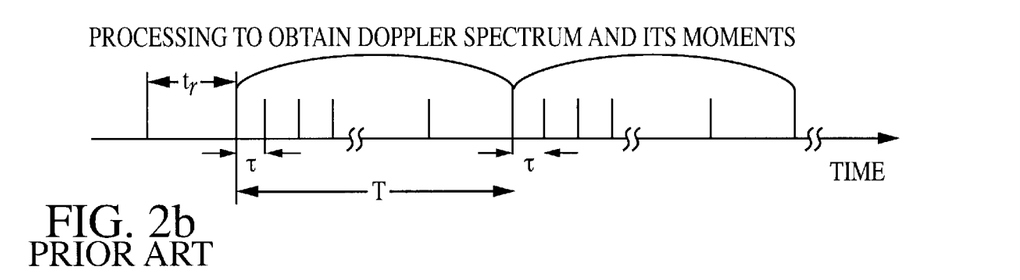

Current conventional method used to reduce the statistical uncertainty of estimates is to average signals over many pulses and often average the signals in range (distance), see FIG. 2(b). Then the variance reduction of the estimates is inversely proportional to the equivalent number of independent samples $M_I$. The variance. reduction depends on the correlation between samples and the total number M of samples averaged according to the following relationship:

$$M_I^{-1} = \sum_{m=-M+1}^{M-1} \frac{M-|m|}{M^2} c_m, \quad (1)$$

where the correlation coefficient Cm refers to time (from pulse to pulse) or range, and m is an integer indicating the lag. For correlation in sample time, the lags are mT, where T is the pulse repetition time; for sampling in range the lags are m( τL), where τ is the pulse length and L an integer (or a number larger than 1) if the pulse is over sampled in range. The time correlation function depends on the Doppler spectrum width, which is one of the parameters to be estimated. If samples are averaged in range and the radar resolution volume (i. e., pulse volume) is uniformly filled with scatterers, the correlation coefficient is determined by the pulse shape and the receiver filter impulse response as detailed in the book "Doppler Radar and Weather Observations, 2nd edition, R. J. Doviak and D. S. Zrnic, 1993 Academic Press, Inc. San Diego, 562 pp.

Figure 1A:
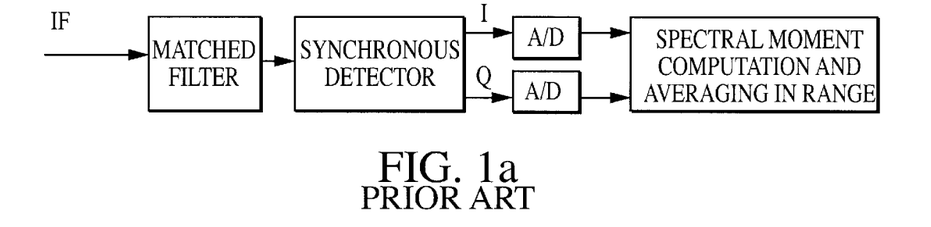
FIG. 1(a) and FIG. 1(b) are schematic diagrams of prior art signal processing using an analog and a digital, respectively, of intermediate frequency chain.
Figure 1B:
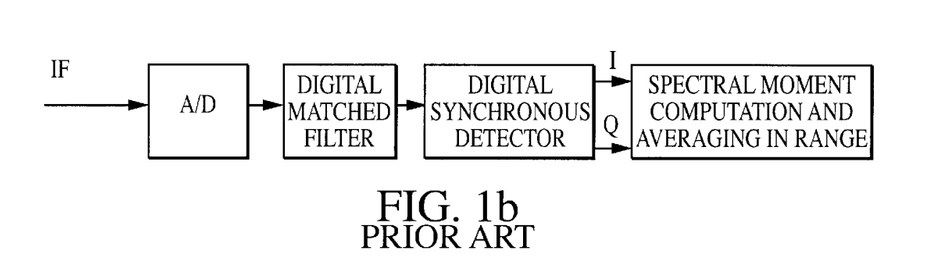

As background to the present invention reference is made to the prior art graphical results as set forth in figures FIG. 1(a) and FIG. 2(b). In these figures two methods currently in use are depicted. In one method, FIG. 1(a), an analog matched filter in the intermediate frequency (IF) stage is used. After detection, digital conversion at a rate of about $\tau^{-1}$ is made to obtain the complex signal. Two or more estimates of variables from these samples are averaged along the selected range and thus a gain of two or more independent samples as shown in FIG. 1(a) is achieved. In the second method,( FIG. 1(b)), the analog matched filter is omitted and the IF signal is digitized. The second method passes the signal through a digital matched filter; this filter can be placed before the synchronous detector, as FIG. 1(b), or after; then estimates of correlations, spectral moments and polarimetric variables are made; these estimates are averaged in range over a few pulses (i. e., few durations, as shown in FIG. 1(b). Either of the methods in FIG. 1(a) or FIG. 1(b) graphically increases the number of independent samples but not to the fullest extent possible; both procedures sacrifice range resolution.

The first method is used, for example, on the national network of weather radars (WSR-88D). Sampling in range is at 1.67 micro seconds (250 m), several samples are averaged in time and then four samples are averaged in range to decrease the variance and provide a 1 km range resolution. The second method is used on the Sigmet RVP7 receiver and processor.

Figure 2C:
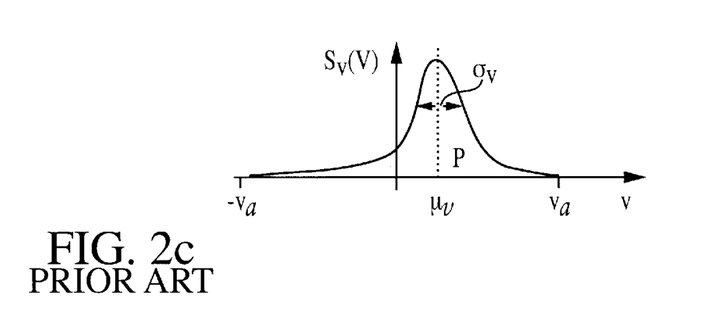
Figure 2D:
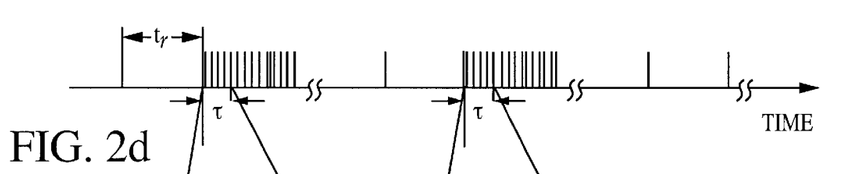
Figures 2E, 2F:
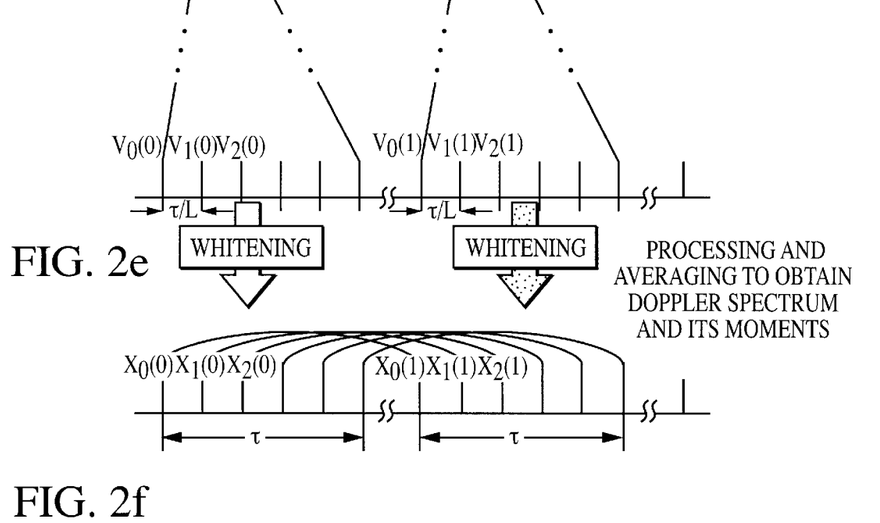

FIGS. 2(a)–2(c) depict a sampling in range and the processing of signals according to the prior art. The proposed method of the present invention is depicted in FIGS. 2(d)–2(f). FIG. 2(a) is a graph depicting transmitted pulses of duration τ and the pulse repetition time T for a transmitted pulse sequence. FIG. 2(b) shows samples in range with spacing equal to the pulse length and the standard processing to obtain the Doppler spectrum and its moments. FIG. 2(c) shows the Doppler spectrum and its moments. FIG. 2(d) is a graph of the over sampling in range. In FIG. 2(e), a zoomed presentation is shown of range locations (over sampled) at which Doppler and polarimetric variables, including spectra, are estimated. Range samples in this figure which are to be whitened (decorrelated) are indicated. The last figure, FIG. 2(f), is a graph of the processing of whitened samples to obtain independent estimates of spectra, spectral moments, and polarimetric variables, in range.

Figure 3:
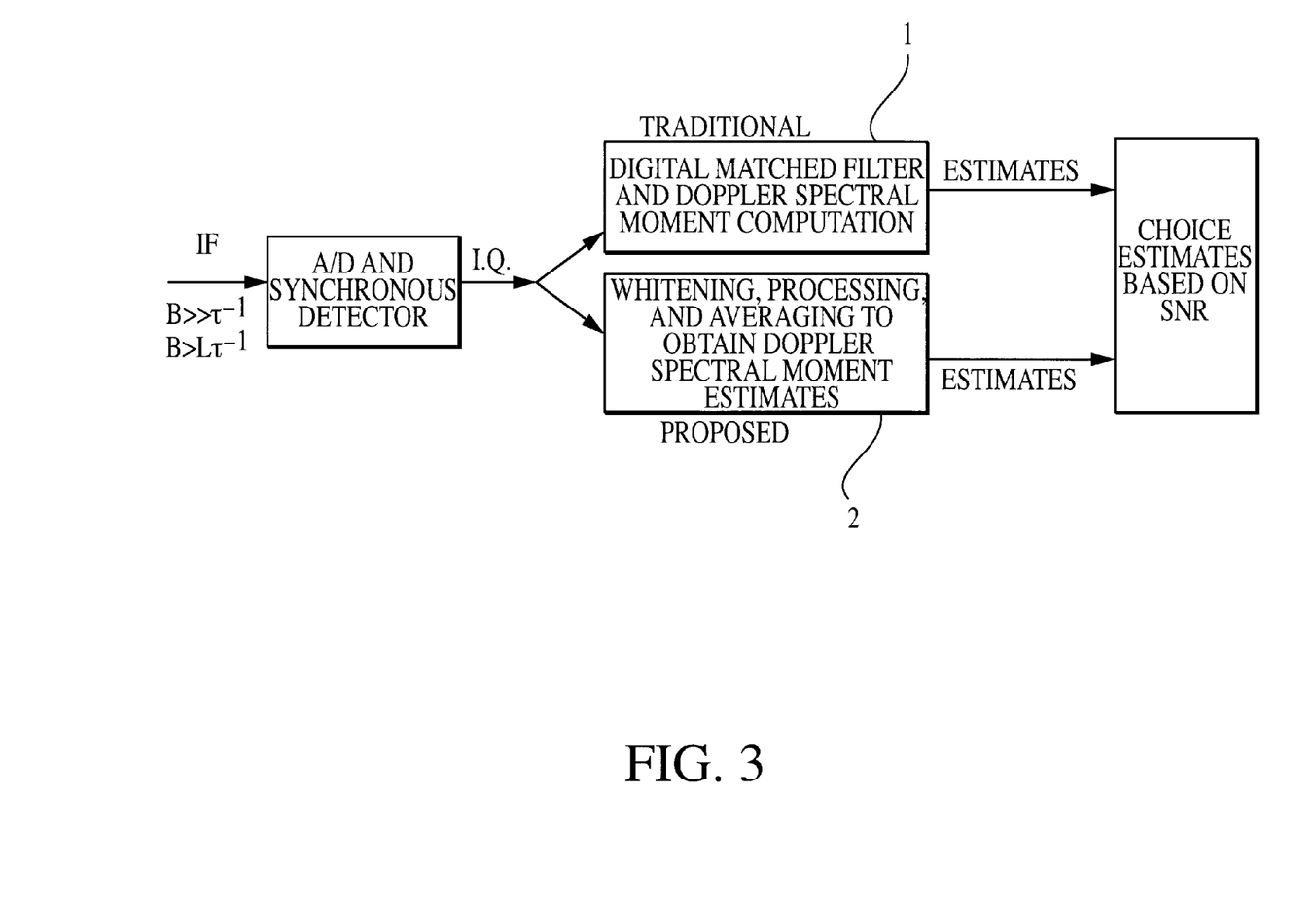
FIG. 3 is a flow block diagram of the method steps of the present invention which partially uses conventional prior art method steps.

It is an objective of the present invention to provide an improved method which increases the number of independent samples while the sacrifice in range resolution is minimal. FIG. 3 is a flow block diagram of the method steps of the present invention which partially uses conventional prior art method steps. The digital in-phase signal (I) and quadrature phase (Q) components of the signal are supplied at a rate faster than $\tau^{-1}$, (1 MHz for a 1 μs pulse), say $L\tau^{-1}$ (a reasonable L is from 4 to 10), and the receiver bandwidth B is much larger (up to 10 times) than $\tau^{-1}$, and larger but comparable to $\tau^{-1}$. If the system is incoherent and reflectivity or spectrum widths are estimated, then echo power samples would be digitized and processed. The signals are split into two channels. The traditional or prior art processing takes place in the upper block or channel 1 and involves the digital matched filter and classical spectral moment estimation methods. In channel 2, the signals are processed according to the methods of the present invention.

The proposed new method entails whitening in range the over sampled signals, processing of time samples by any one of the well known algorithms, and combining the results from the whitened signals in range to yield significant reduction in variances of the estimates. This variance reduction occurs only if the signal to noise ratios are relatively high (greater than 15 dB) as is usually the case for most signals in weather surveillance radars. At low signal to noise ratios (less than 10 dB) the variances increase so that there are crossover points (these are different for different estimates) of the variances for the conventional and proposed estimators. Below the cross over SNR (signal to noise ratio), the classical processing produces lower variances. In general the cross over SNR depends on the variable that is to be estimated and on some other parameters (e.g., spectrum width, number of samples, etc.). An objective decision on which estimates to use, classical or the ones obtained from using the method of the present invention, from whitened samples in range, is based on the SNR and on estimates of other parameters that affect the variance. To avoid parallel computation, the choice of which channel to use can be made from an a priori knowledge of the SNR, or data may be stored and processed in the appropriate channel after the SNR has been determined. Alternatively, both processing in channels 1 and 2 proceed simultaneously and the decision on which one to use can be made at the end of the dwell time.

The procedure starts with over sampling in range so that there are L samples during the pulse duration τ (that is over sampling is by a factor of L). Sample spacing need not be uniform for application of this procedure; however uniform sampling is assumed for simplicity. The bandwidth of the system under consideration (radar, sonar, sodar, blood flow acoustic meter, etc.) up to the sampling circuits should be larger than L/τ, (modifications on how to apply the procedure to arbitrary band widths are indicated later). Assume that the range of depth cτ/2 (where c is the velocity of light, or sound in the sonar case) is uniformly filled with scatterers. For relatively short pulses this is a common occurrence. For convenience, the contribution from the pulse volume to the sampled complex voltage $V_k(n)=I_k(n)+jQ_k(n)$ at a fixed time delay (also called range time, indicated by the index k), can be decomposed into sub contributions $s_i$ from L contiguous slabs each cτ/2L thick. The index n indicates time at pulse repetition increments T, also called sample time. The voltages $s_i$ are identically distributed complex Gaussian random variables, the real and imaginary part [Re $(s_i)$ and Im $(s_i)$] have variances σs², and the power of $s_i$ is σ²=2 $\sigma_s^2$. Pulse of an arbitrary shape $p_k$ (k are time increments within the transmitted pulse which correspond to a decreasing index in range, see the publication by Doviak and Zrnic, equation 4.17) induces weighting to the contributions from contiguous slabs such that the composite voltage is:

$$V_k = \sum_{i=0}^{L-1} p_{L-1-i} S_{k+i}. \quad (2)$$

Note that the $p_k$'s need to be chosen such that the sum of $(p_k)^2$ over L samples equals to 1 (then the correlation coefficient $c_m$ in the next equation will be correctly normalized). The autocorrelation function in range, $E(V_k^* V_{k+m})$ equals to the autocorrelation of the pulse envelope times $\sigma^2$ and the correlation coefficient of the $V_k$ samples is therefore:

$$c_m = \sum_{k=0}^{L-1} p_k p_{k \cdot m}, \quad (3)$$

for m between −L+1 and L−1, and 0 otherwise.

For a rectangular pulse, $c_m$ has a triangular shape. For other pulse shapes, $c_m$ can be readily evaluated from equation (3). Implicit in equation (3) is the assumption that L/τ is much smaller that the receiver bandwidth. The case where this assumption does not hold is addressed later.

The whitening method step is as follows: Define the Toeplitz symmetric correlation coefficient matrix C ($c_0$=1 on the main diagonal, $c_1$ on the first off diagonal, $c_2$ on the second off diagonal, etc.). Because it is positive semi definite, this matrix can be decomposed into a product of a matrix H and its transpose as:

$$C = H^{t\ -1} H^{-1} H^t \quad (4)$$

where the superscript t indicates matrix transpose. Any H that satisfies (4) is the inverse of a whitening transformation matrix:

$$W = H^{-1}, \quad (5)$$

which if applied to the range samples [in vector notation $V^t = (V_0, V_1, \ldots V_{L-1})$] produces L uncorrelated random variables $X_k$ (k=0 to L−1) in range $$X_k = \sum_{i=0}^{L-1} w_{k,i} V_i, \quad (6)$$

where $w_{k,i}$ are the elements of W.

In the case of weather radar the signals have Gaussian distributions and therefore the variables $X_k$ are independent. Various methods to obtain H by decomposing C are discussed later.

Denote with $X_k$ (nT) the sequence of time samples spaced T s apart each of which is obtained as in equation (6). From these the spectral moments and polarimetric variables are estimates as follow:

Power:

$$P = \frac{K}{ML} \sum_{k=0}^{L-1} \sum_{n=0}^{M-1} |X_k(nT)|^2 \quad (7)$$

Scaling constants that make equation (7) dimensionally correct are incorporated in the term K.

Mean Doppler velocity, Doppler spectrum and its width:

Several options exist for determining the mean velocity. Autocovariance processing produces correlation estimates in sample time $$R_k(mT) = \frac{1}{M} \sum_{n=0}^{M \cdot |m|-1} X_k^*(nT) X_k(nT + |m|T), \quad (8)$$

where |m| is between 0 and M−1. $R_k$(mT) are averaged in range (over the index k) so that the variance of the estimate $$R(mT) = \frac{1}{L} \sum_{k=0}^{L-1} R_k(mT), \quad (9)$$

is inversely proportional to L. Then the mean velocity is obtained from the argument of R(T), and the spectrum width from ratios |R(0)/R(T)| or |R(2T)/R(T)|. The spectrum can be obtained directly from equation (9) and then processed to obtain its moments. As an alternative, the Fourier transform is first applied to the signal $X_k$(nT) at a fixed range location, usually using the FFT (Fast Fourier Transform) algorithm. Then the spectra from L consecutive range locations, which are independent, are averaged to greatly reduce the variance of estimates.

Polarimetric variables:

Denote with $V_k$ the echo corresponding to the vertical polarization as in equation (2) and with $H_k$ the echo corresponding to the horizontal polarization and let the whitened signals in range be $X_k$ for vertical and $Y_k$ for horizontal polarization. If simultaneous transmission of H, V is employed (see U.S. Pat. No. 5,500,646 "Simultaneous Differential Polarimetric Measurements and Co-polar Correlation Coefficient Measurements" by D. S. Zrnic, issued Mar. 19, 1996) the powers $P_H$ and $P_V$ at the orthogonal polarizations are obtained as in equation (7) and their ratio yields the differential reflectivity which is a useful variable for detecting presence of hail.

Another polarimetric variable that enhances the classification and quantification of precipitation is the correlation between the two co-polar signals. One co-polar signal is for vertical polarization of transmitted and received waves the other signal is for horizontal polarization of these waves. This correlation is obtained as:

$$\rho_{hv}(0) = \frac{\sum_{k=0}^{L-1} \sum_{n=0}^{M-1} X_k^*(nT) Y_k(nT)}{\sqrt{\sum_{k=0}^{L-1} \sum_{n=0}^{M-1} |X_k(nT)|^2} \sqrt{\sum_{k=0}^{L-1} \sum_{n=0}^{M-1} |Y_k(nT)|^2}}, \quad (10)$$

and the argument of equation (10) gives the total differential phase.

There are two more correlation coefficients (see the Doviak and Zrnic's book entitled "Doppler Radar and Weather Observations", 1993, page 243.) One is between the copolar horizontally polarized signal (i. e., transmitted and received signals are vertically polarized) and the cross-polar vertically polarized signal (transmitted signal is horizontally polarized, whereas the received signal is vertically polarized). the other is between the copolar vertically polarized and the cross-polar horizontally polarized signal. Because of reciprocity the cross-polar signals are identical, hence only one $Q_k$(nT) needs to be computed. Then the correlation coefficients between the copolar and cross polar components are obtained by correlating $Q_k(nT)$ with $X_k(nT)$ and with $Y_k(nT)$.

If alternate switched transmission is used for measuring the polarimetric variables and reception of the copolar $H_k(2nT)$, $V_k(2nT+T)$, and cross-polar components $Q_k(2nT)$, $Q_k(2nT+T)$ is made then all these signals are whitened in range first and then the usual processing in time (as set forth in Doviak and Zrnic's book entitled "Doppler Radar and Weather Observations", 1993) is made. This entails either averaging the spectrum estimates or various autocovariance estimates in range from which the spectral moments are obtained. For example, to obtain the linear depolarization ratio (LDR) one first whitens the cross polar signal $Q_k(2nT)$ in range; then the average in range and time produces the power estimate $P_w$. By definition $LDR=P_w/P_h$, where $P_h$ is now obtained from the whitened horizontally polarized signals $X_k(2nT)$. The multipliers in the argument, 2n and 2n+1, distinguish between the two interlaced sequences of transmitted orthogonal polarization states (i. e., vertical and horizontal).

To construct the whitening matrix W the following procedures are used. In general the orthogonalization is not unique and many well-known methods could be applied to generate different whitened sequences. The present invention pertains to the specific applications of a whitening scheme on pulsed active remote sensors, such as weather radars, lidars, sodars, blood flow meters, etc., when incorporated into the receivers of these sensors the scheme produces superior estimates of the spectrum, its moments, and polarimetric variables if applicable. Two prominent methods to generate whitened sequences are the eigenvalue decomposition (see the C. W. Therrien 1992 reference publication entitled "Discrete Random Signal And Statistical Signal Processing" published by Prentice Hall, Englewood cliffs, N.J., on page 727, sections 2.6 and 2.7) and the triangular or Gram-Schmidt orthogonalization decomposition as described, for example, in the 1984 reference publication of A. Papoulis, entitled "Probability, Random Variable, and Stochastic Processes, second Edition, McGraw-Hill, Singapore, page 576, section 13.1.

In the eigenvalue decomposition method first the eigenvalues $\lambda_i$ of the correlation matrix C are computed and C is represented as $$C = U^* L U^t, \qquad (11)$$

where L is a diagonal matrix of eigenvalues, U is the unitary transformation matrix whose columns are eigenvectors of C, and the superscript t signifies the transpose. Then to obtain W a diagonal matrix D with elements on the diagonal equal to $\lambda_i^{-½}$ is constructed and $$W = H^{-1} = D U^{*t}. \qquad (12)$$

Triangular or Cholesky decomposition is identical to the Gram-Schmidt orthogonalization (see above publication by Papoulis, 1984). The matrix H is a lower triangular matrix. Hence the whitening matrix (equation (5)) is also lower triangular. A possible advantage of triangular H matrices is that whitening can proceed in a pipeline manner, that is computations can start as soon as the first sample is taken and progress through subsequent samples. Non-triangular H matrices require presence of all data before computations can start.

Figure 4A:
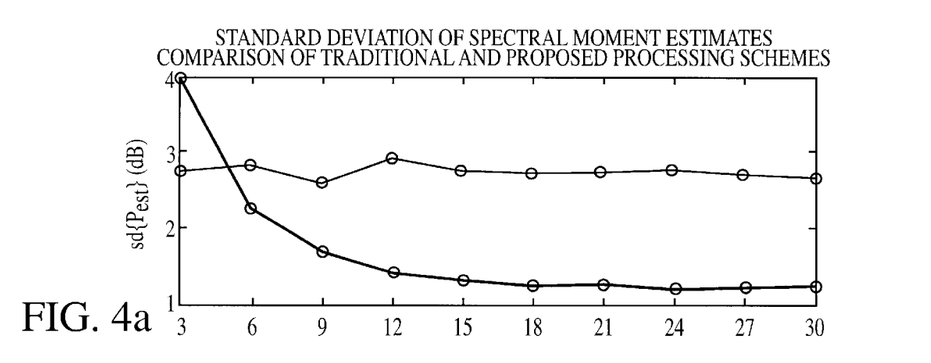
FIGS. 4(a)–(c) are standard deviations of spectral moment estimates are graphs of the standard deviation of spectral moment estimates comparing conventional prior art processing methods to the method of the present invention.
Figure 4B:
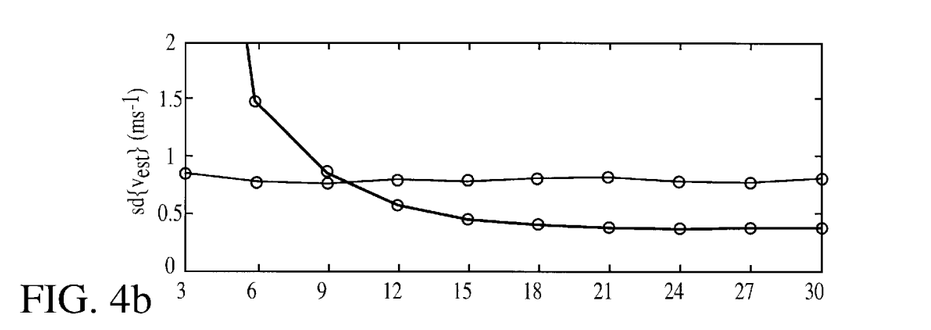
Figure 4C:
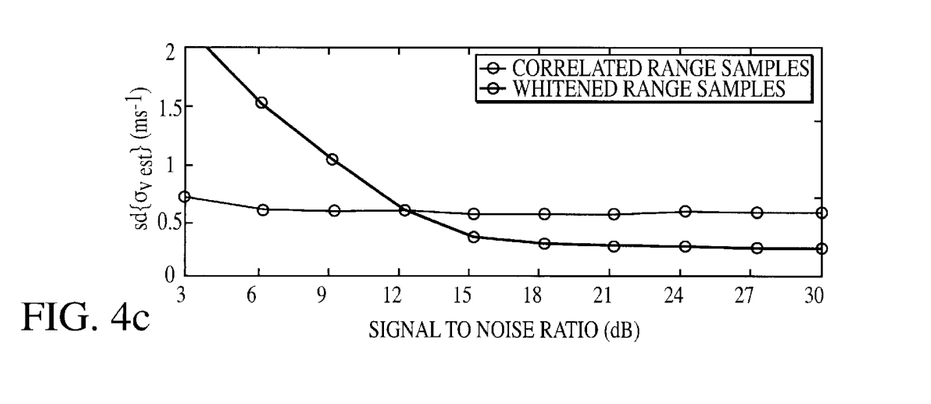
Figure 5A:
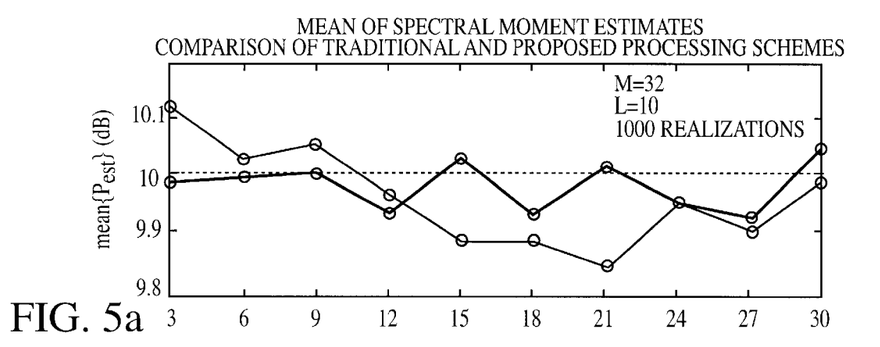
FIGS. 5(a)–(c) are graphs of the mean of spectral moment estimates comparing conventional prior art processing methods to the method of the present invention.
Figure 5B:
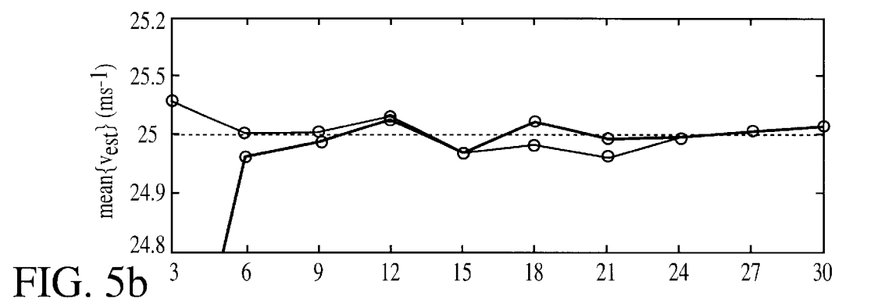
Figure 5C:
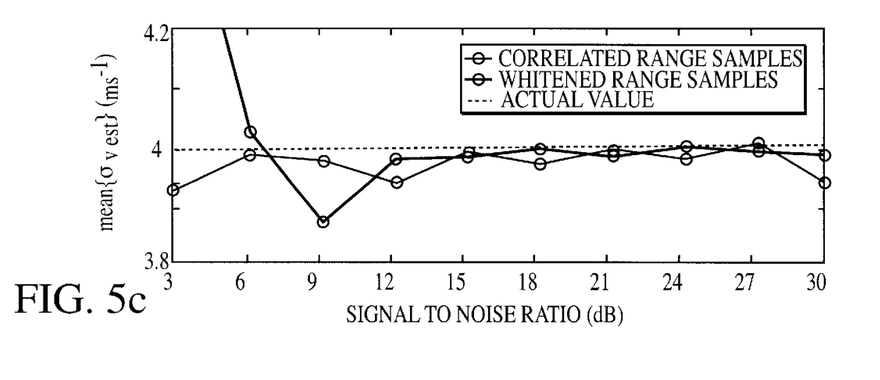

Simulation of the process starting with the slab signal $s_j$, their superposition as in equation (2) and subsequent whitening in range has been made. A pair of such complex signals is simulated with appropriate powers and cross correlations to represent orthogonal linear polarized echoes. A Doppler spectrum with Gaussian shape is imposed. The standard deviations and mean values of estimates are in FIGS. 4(a)–(c) and 5(a)–(c). FIGS. 4(a)–(c) are standard deviations of spectral moment estimates. In FIG. 4(a) a standard deviation of power, the mean Doppler velocity is shown in FIG. 4(b), and the Doppler spectrum width is shown in the FIG. 4(c) graph. These graphs were obtained by simulating correlated range samples and applying both traditional (thin lines) and proposed (thick lines) processing. M is the number of time samples (separated by T seconds) which are used to compute the Doppler spectrum and its moments. L is the over sampling factor, i.e., the number of range samples that are used to reduce the standard error of estimates. The simulation results were obtained from 1000 realizations. For clarity, lines connect the simulation results (circles at SNR increments of 3 dB). In FIG. 5(a)–(c) are graphs of the mean values of spectral moment estimates. In FIG. 5(a), the top graph is the mean of power, the mean Doppler velocity is shown in FIG. 5(b), and the Doppler spectrum width is shown in the bottom graph, FIG. 5(c). These graphs were obtained by simulating correlated range samples and applying both traditional (thin lines), and the proposed (thick lines) new processing. The imposed spectrum width is 4 m s$^{-1}$, the unambiguous velocity is 32 m s$^{-1}$, the over sampling is by a factor of 10, and the dwell time is 32T s. Comparison of results obtained with standard and proposed processing as a function of SNR demonstrates that for this particular set of parameters (at large SNR) the reduction in standard errors is more than two times (FIGS. 4(a)–(c)).

The correlation of samples in range is influenced by both the receiver filter and the transmitted pulse shape. For a filter with an impulse response $h_m$ the composite (equivalent) correlation becomes (see publication of Papoulis, 1984)

$$c_m^t = c_m * h_{-m}^* * h_m, \qquad (13)$$

where the correlation due to transmitted pulse (which need not be rectangular) is $c_m$, and m is lag in range. This equation can be rewritten in an alternate form as $$c_m^e = \sum_{k=0}^{L-1} p_k^e p_{k-m}^e, \qquad (14)$$

where the equivalent "pulse" weighting function is $p_k^e = p_k * h_k$. Thus $p_k^e$ is a convolution of the pulse envelope with the receiver impulse response. A simple way to obtain this is to attenuate the transmitted pulse, inject it into the receiver and over sample the output. Substituting the equivalent pulse $p_k^e$ into equation (3) produces $c_m$; this is done once for a fixed pulse shape and receiver bandwidth. Whitening of the range samples can now be accomplished following the previously described procedure.

Alternate whitening procedures are also possible. An alternate way to produce spectral moment and polarimetric variable estimates using a whitening transformation is now discussed. As mention above, variables of interest are obtained from time series (I, Q) data by an intermediate step involving either correlation or spectral methods. It is possible then to move the whitening transformation one step further in the processing chain.

The modified procedure starts by computing spectral coefficients along sample-time for each set of over sampled data. After computing spectral coefficients, the spectrum peak can be found and only a few spectral components around this peak are needed to determine reflectivity, Doppler velocity, spectrum width, and the polarimetric variables. These few complex spectral coefficients can be then whitened and averaged as before to obtain more accurate estimates.

Figure 6A:
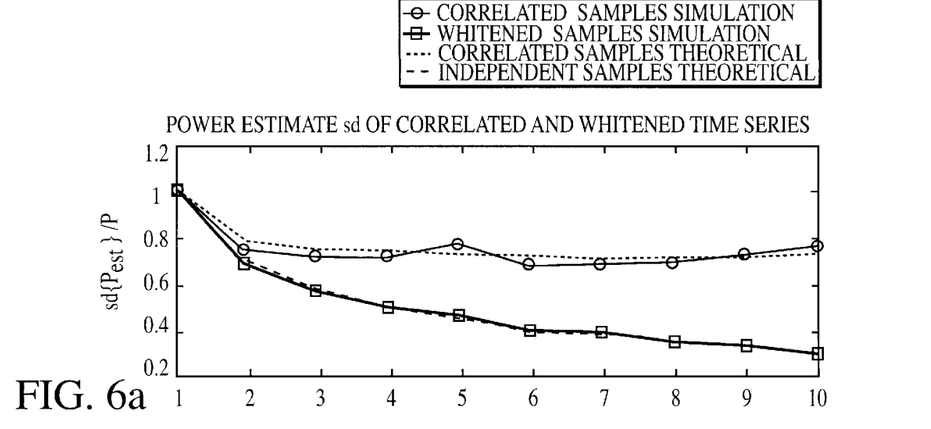
FIGS. 6(a)–(c) show graphs comparing simulation results with theoretical predictions for the power estimate of correlated and whitened time series, the variance reduction and the power estimate mean of correlated and whitened time series.
Figure 6B:
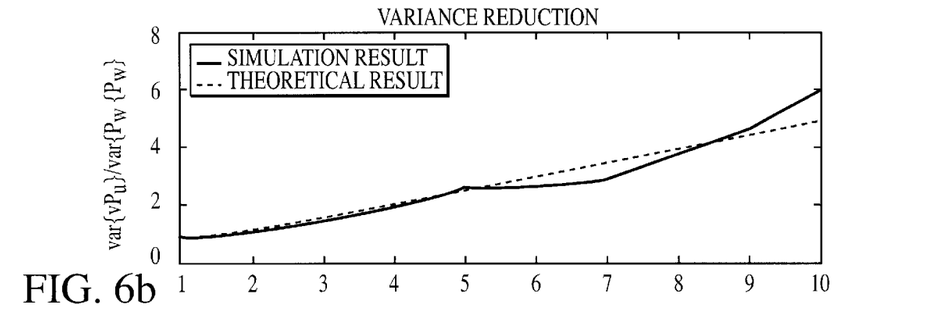
Figure 6C:
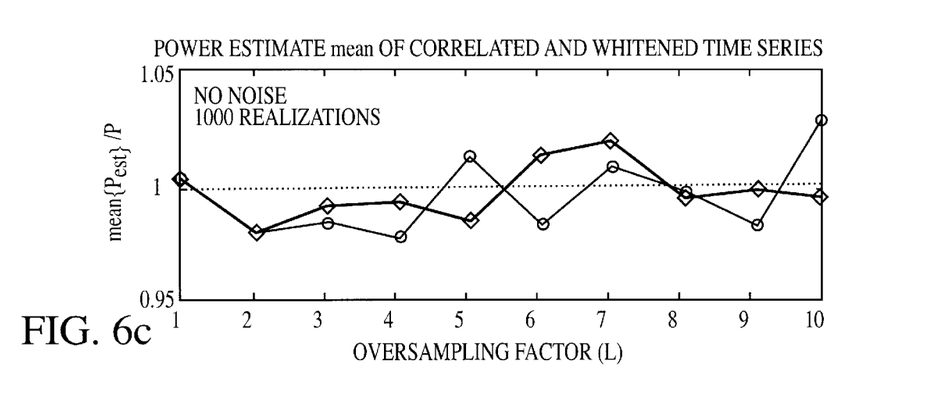

FIGS. 6(a)–(c) shows graphs comparing simulation results with theoretical predictions of standard deviation of the power estimate of correlated and whitened time series (FIG. 6(a)), the variance reduction (FIG. 6(b)) vs. the over sampling factor L and the normalized mean powers in the bottom graph or FIG. 6(c). In summary, the whitening transformation of samples in range can be applied to time series data or to complex spectral coefficients. Whereas the former requires more computations because the whitening transformation needs be applied to all the samples along sample time, the latter can use fewer computations but requires prior determination of significant (strong) spectral coefficients.

Although the preferred embodiment of the present invention and the method of using the same has been described in the foregoing specification with considerable details, it is to be understood that modifications made to the invention which do not exceed the scope of the appended claims and modified forms of the present invention done by others skilled in the art to which the invention pertains, will be considered infringements of this invention when those modified forms fall within the claimed scope of this invention.

What we claim as our invention is:

1. A method for estimating Doppler spectrum, its moments, and polarimetric variables for use with pulsed radar, lidar, sonar or sodar comprising the steps of:
   (a) determining the correlation function in range time from a transmitted pulse and radar filter impulse response by selecting pulsed weather radar signals having a transmitted pulse length whose Doppler spectrum is to be estimated;
   (b) sampling pulsed weather radar signals at a rate several time larger than the reciprocal of the transmitter pulse length equivalent to the reciprocal of the correlation time determined in step (a);
   (c) decorrelating the samples from step (b) in range time using the correlation function determined in step (a);
   (d) determining reflectivity of the samples of step (c) from several transmitted pulses and consecutive range locations;
   (e) determining autocorrelations of the signals decorrelated in step (c) at fixed range locations and at lags corresponding to transmitted pulse repetitions;
   (f) determining the spectra of signals decorrelated in step (c) at fixed range locations;
   (g) determining, for polarimetric radars, reflectivities at orthogonal polarizations, cross polarizations and cross correlation of co-polar and cross polar signals;
   (h) averaging the reflectivities, autocorrelations, spectra, and various co-polar and cross polar correlations obtained in step(g); and
   (i) based upon the determinations of steps (c) to (h), estimating mean reflectivity, mean velocity, Doppler spectrum width, and polarimetric variables.

2. The method as claimed in claim 1, wherein the estimating of step (i) takes into consideration combined weighted averages over the the powers, autocorrelations, cross correlations, and complex spectra of sampled signals of step(b) in a range.

3. The method as claimed in claim 2, wherein the estimating of step (i) and the weighted averages are chosen such the over sampled signals become uncorrelated to generate an equivalent number of independent samples in range which equals the number of sampled signals in range to decrease the variance of estimates.

4. The method as claimed in claim 3, wherein the variances determined are inversely proportional to the number of over sampled signals in range.

* * * * *